United States Patent [19]

Stiskin et al.

[11] Patent Number: 5,022,685
[45] Date of Patent: Jun. 11, 1991

[54] SECONDARY CONTAINMENT SYSTEM AND METHOD

[76] Inventors: Hal Stiskin, 19400 Cypress Point Dr., Northridge, Calif. 91326; Joseph M. Hogan, 30715 Lindsay Canyon Dr.; Thomas A. Jones, 26847 Chuckwagon Pl., both of Canyon Country, Calif. 91351

[21] Appl. No.: 396,222

[22] Filed: Aug. 21, 1989

[51] Int. Cl.$^5$ .............................................. F16L 55/00
[52] U.S. Cl. ...................................... 285/45; 285/15; 285/156; 285/284; 285/330; 285/419; 285/914; 285/919; 138/166
[58] Field of Search .................. 285/10, 21, 23, 45, 285/65, 67, 68, 70, 73, 156, 292, 295, 294, 297, 284, 373, 406, 419, 914, 919, 921, 15, 330; 138/156, 157, 158, 166, 170, 171, 164; 73/40.5 R, 49.1

[56] References Cited

U.S. PATENT DOCUMENTS

| | | |
|---|---|---|
| 102,116 | 4/1870 | Harris et al. |
| 2,255,921 | 9/1941 | Fear . |
| 2,324,181 | 9/1940 | Tulien . |
| 2,344,424 | 2/1943 | Singleton . |
| 2,475,635 | 7/1949 | Parsons . |
| 2,573,366 | 10/1951 | Scholl . |
| 2,650,112 | 8/1953 | Kinkead . |
| 2,680,631 | 6/1954 | Smith ........................ 285/156 X |
| 2,756,032 | 7/1956 | Dowell . |
| 2,766,614 | 10/1956 | Cook . |
| 2,860,311 | 11/1958 | Balian . |
| 2,896,669 | 7/1959 | Broadway et al. .............. 285/45 X |
| 2,938,569 | 3/1960 | Goodrich . |
| 3,126,035 | 3/1964 | Espetvedt . |
| 3,246,917 | 4/1966 | Martin . |
| 3,425,456 | 2/1969 | Schibig . |
| 3,455,336 | 7/1969 | Ellis . |
| 3,572,395 | 3/1971 | Burns . |
| 3,721,270 | 3/1973 | Wittgenstein . |

(List continued on next page.)

FOREIGN PATENT DOCUMENTS

| | | |
|---|---|---|
| 399192 | 7/1924 | Fed. Rep. of Germany . |
| 2357812 | 2/1978 | France ............................. 285/419 |
| 59-112242 | 6/1984 | Japan . |
| 808948 | 8/1957 | United Kingdom . |
| 1054035 | 1/1967 | United Kingdom . |
| 2023296 | 12/1979 | United Kingdom . |

OTHER PUBLICATIONS

PVC and ABS Injected Solvent Cemented Plastic Pipe Joints, ASTM Designation F 545 (1985).

*Primary Examiner*—Dave W. Arola
*Assistant Examiner*—Jeffrey L. Thompson

[57] ABSTRACT

A secondary containment pipe system disposed around a primary pipe system and comprising a joint that is divided along a central parting plane and has laterally projecting flanges that form internal passages for adhesive sealing cement, that is injected through ports while the joint is clamped together around secondary containment pipes. The joint has pipe sockets that have internal grooves that also are filled with injected cement, thus forming a continuous, uninterrupted seal around the interior of the joint, and also has spillover grooves and wells for minimizing leakage, and lateral aligning surfaces. The clamping means are C-shaped clips that can be left in place indefinitely. The secondary containment pipes also are divided, being formed by elongated pipe elements fitted together around the primary pipes and having snap-latching coupling means along their abutting edges. One embodiment has internal reinforcing flaps that extend across the abutting edges and define internal sealing passages along the coupling means to be filled with injected adhesive cement through external ports, and also has means along the free edges for holding the flaps in place. A second pipe embodiment has tongue-and-groove couplings along thickened edges, and internal passages along the couplings in the form of enlarged coupling grooves, and an external reinforcing strip is provided for optional use in pressurized systems.

66 Claims, 5 Drawing Sheets

U.S. PATENT DOCUMENTS

| | | | |
|---|---|---|---|
| 3,722,925 | 3/1973 | Robbins . | |
| 3,785,407 | 1/1974 | Waite et al. . | |
| 3,802,456 | 4/1974 | Wittgenstein | 285/93 X |
| 3,847,208 | 11/1974 | Ollendorf . | |
| 3,874,708 | 4/1975 | Gresens . | |
| 3,899,007 | 8/1975 | Miller . | |
| 3,944,260 | 3/1976 | Petroczky | 285/15 |
| 4,062,376 | 12/1977 | McGrath . | |
| 4,095,041 | 6/1978 | Netzel et al. . | |
| 4,098,476 | 7/1978 | Jutte et al. . | |
| 4,157,194 | 6/1979 | Takahashi . | |
| 4,172,607 | 10/1979 | Norton . | |
| 4,182,378 | 1/1980 | Dieter . | |
| 4,184,702 | 1/1980 | Morris . | |
| 4,250,927 | 2/1981 | Newburg . | |
| 4,250,928 | 2/1981 | Nishikawa . | |
| 4,280,535 | 7/1981 | Willis . | |
| 4,282,743 | 8/1981 | Pickett . | |
| 4,345,785 | 8/1982 | Bradford . | |
| 4,374,596 | 2/1983 | Schlemmer et al. . | |
| 4,397,304 | 9/1983 | Villain . | |
| 4,400,019 | 8/1983 | Fruck . | |
| 4,413,733 | 11/1983 | Dunn et al. . | |
| 4,422,675 | 12/1983 | Norris et al. . | |
| 4,426,108 | 1/1984 | Kesselmam | 285/45 X |
| 4,429,907 | 2/1984 | Timmons | 285/373 |
| 4,452,097 | 6/1984 | Sunkel . | |
| 4,466,273 | 8/1984 | Pillette . | |
| 4,523,779 | 6/1985 | Knox . | |
| 4,537,426 | 8/1985 | Carter, Sr. . | |
| 4,552,166 | 11/1985 | Chadbourne et al. . | |
| 4,573,527 | 3/1986 | McDonough . | |
| 4,576,846 | 3/1986 | Noel . | |
| 4,633,913 | 1/1987 | Carty et al. . | |
| 4,653,958 | 3/1987 | Anderson et al. . | |
| 4,667,505 | 5/1987 | Sharp . | |
| 4,673,926 | 6/1987 | Gorman . | |
| 4,715,474 | 12/1987 | Wehmeyer | 403/268 X |
| 4,723,441 | 2/1988 | Sweeney . | |
| 4,786,088 | 11/1988 | Ziu . | |
| 4,870,856 | 10/1989 | Sharp | 285/373 X |

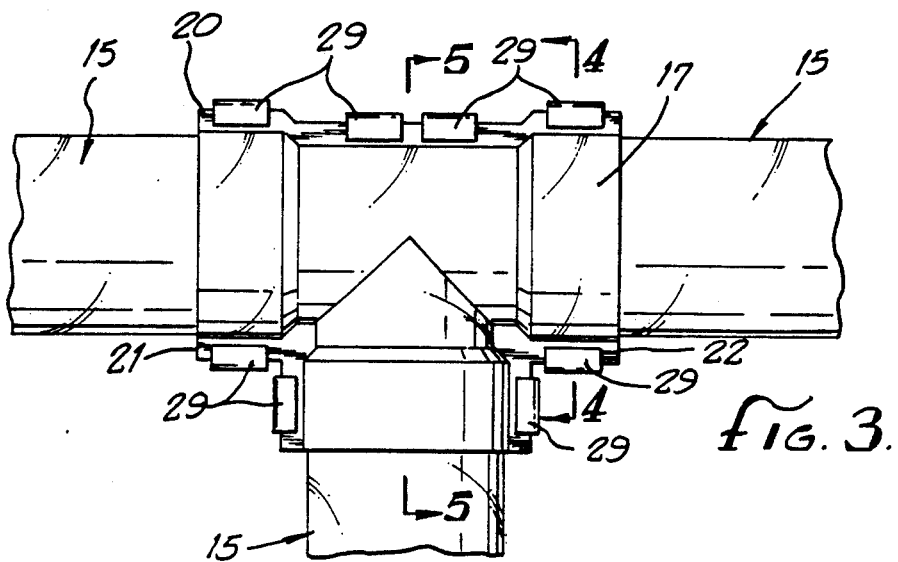
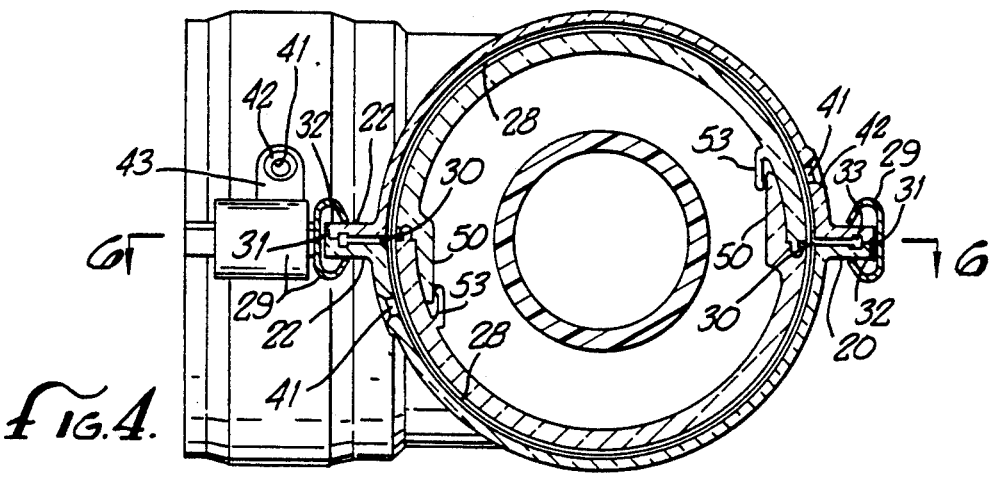
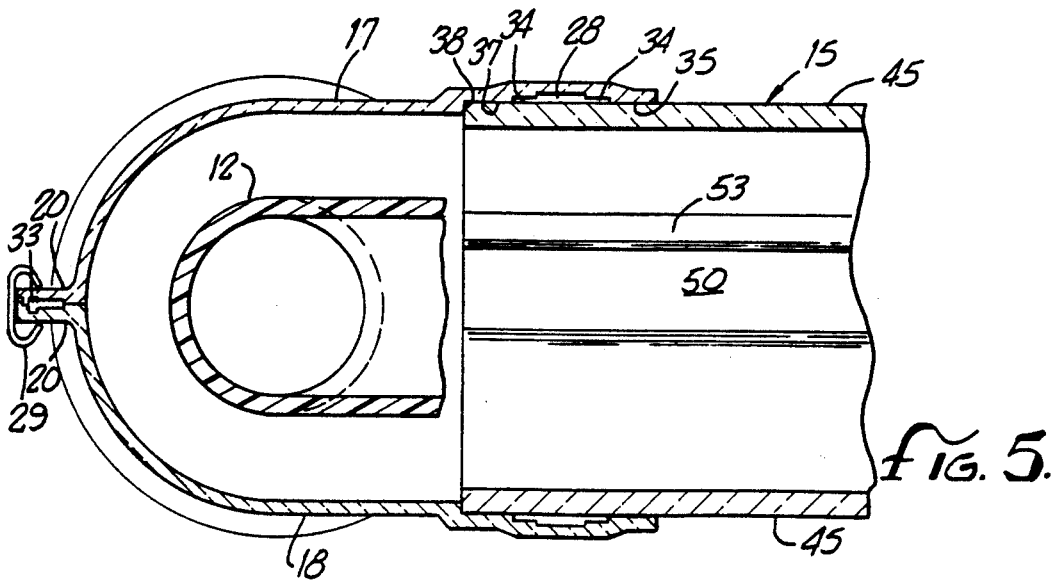

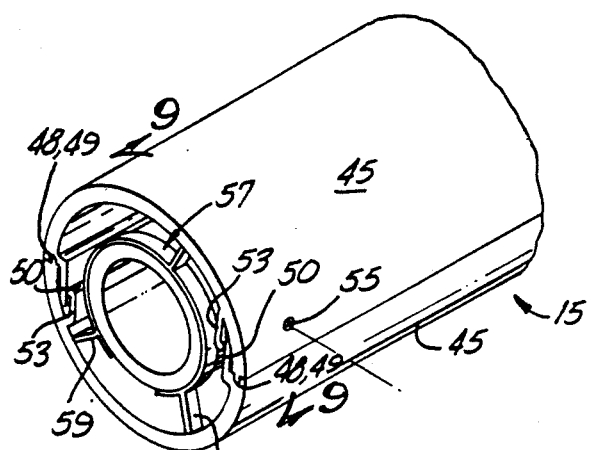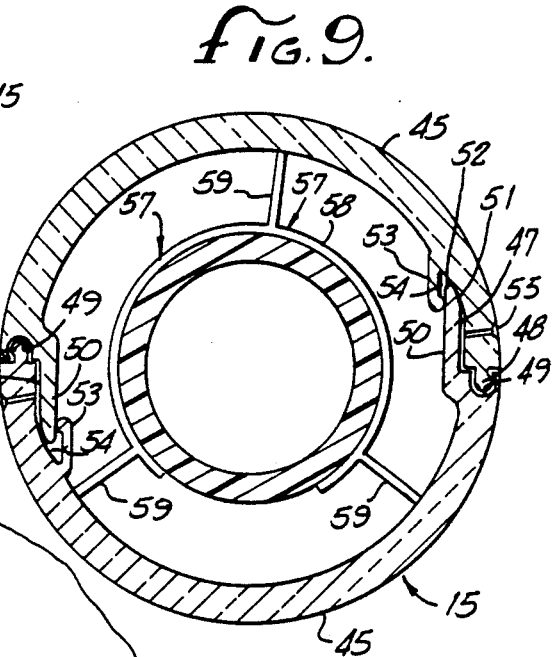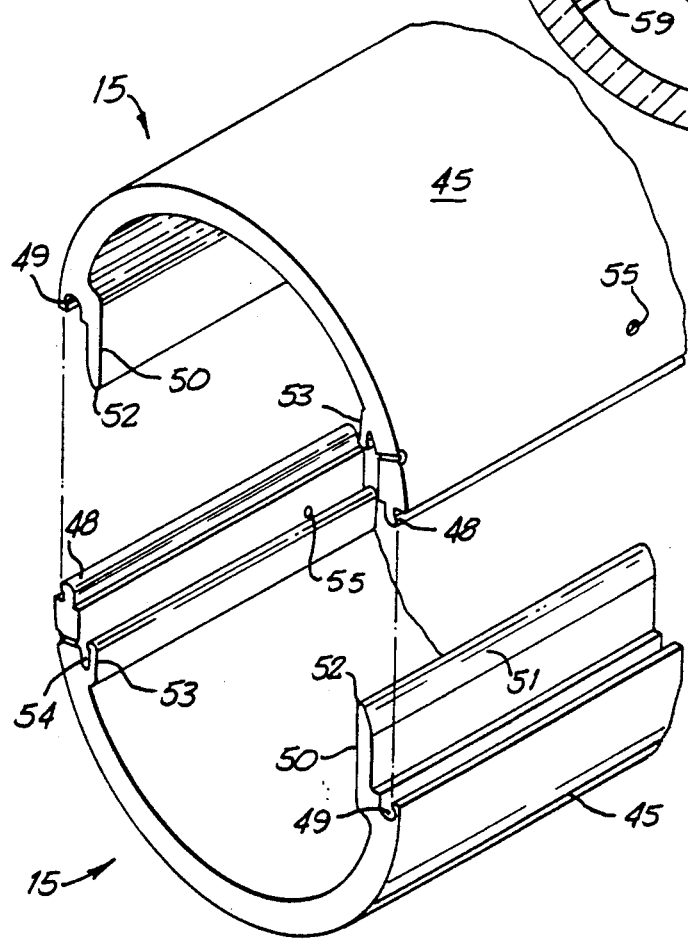

SECONDARY CONTAINMENT SYSTEM AND METHOD

BACKGROUND OF THE INVENTION

This invention relates to secondary containment systems for preventing the escape of materials that may leak from a primary containment system, and has particular reference to a secondary containment system for a primary pipe system of pipes joined together in various configurations by pipe joints having pipe sockets for receiving the ends of the pipes. The pipes are secured and sealed in the sockets in various ways that are intended to prevent leakage of fluid from the primary system.

Protection of the environment from polution by leakage from primary containment systems is a major problem today and is receiving increasing attention, from both industry and government. More and more attention and effort are being devoted to both clean-up of existing spills and prevention of further contamination by existing and new containment systems. The consequences of such spills have been very serious, and the expense of clean-up efforts can be enormous, making it both environmentaly and economically important to prevent leakage of hazardous materials, typically chemical and petroleum products but also including sewage.

Governmental regulations in the United States now require secondary containment on many new installations, such as chemical storage systems, and will require secondary containment on many pre-existing systems within a few years. Even now, there are existing primary pipe systems that are leaking, or susceptible to leaking, so as to require the installation of protective secondary containment systems. There is, therefore, a significant need for a practical and economical secondary containment system.

Several different approaches have been suggested for the secondary containment problem, one of the relatively recent approaches being described in U.S. Pat. No. 4,786,088. This patent discloses a double-containment thermoplastic pipe assembly comprising a containment pipe and carrier pipe joined by relatively complex restraint couplings and pipe joints, some of the latter being of a split configuration to be welded together around a primary pipe joint. Other secondary containment approaches are identified or discussed in the Background section of this patent, along with some generally related dual systems, connectors and the like.

Another example of a dual system is U.S. Pat. No. 4,374,596, which discloses an electrical duct connector with longitudinally divided pipe sections and pipe fittings that can be snapped together. U.S. Pat. No. 3,572,395 shows a generally similar split elbow joint. Other representative prior secondary containment pipe systems and elements are shown in U.S. Pat. Nos. 3,721,270, 3,802,456, 4,422,675 and 4,673,926, all concerned with the containment of leakage from primary pipes and joints. The '926 patent illustrates an important auxiliary feature of such systems, the provision of leak detection and signaling means in the secondary containment systems, so that corrective action can be taken to terminate leakage from the primary system into the secondary system.

Yet another approach, used by Harrington Industrial Plastics, Los Angeles, Calif. and elsewhere, has been the use of standard thermoplastic pipe and fittings, of a material such as polyvinylchloride ("PVC"), with oversize secondary containment pipes telescoped over the primary pipe and joined over the conventional primary pipe joints by oversize secondary containment fittings that have been cut, usually by sawing, into two pieces that can be reassembled, clamshell fashion, around the primary pipe joint. These fittings then are bonded together, as by hot-welding of the saw-cut edges, and are suitably sealed to the secondary pipes, usually with a sealing cement. Arcuate spacers with radially extending fingers have been provided in different sizes to maintain the two pipe systems in spaced coaxial relation.

Despite all of these prior efforts to provide effective, practical and reasonably priced secondary containment systems, there as yet is no system that is completely satisfactory. Many suffer from undue complexity and cost in manufacture, assembly, or installation, and most are not capable of being practically applied to an existing primary system, to provide effective secondary containment on a retrofit basis.

SUMMARY OF THE INVENTION

The present invention has the primary objective of providing a secondary containment system that satisfies these needs, being relatively simple and inexpensive in construction, quickly and easily installed without need for complex equipment, both as a part of an original installation and as a retrofit system on an existing primary pipe system, and also being readily checked during assembly, and afterward, to insure complete sealing in order to verify the integrity of the system. In addition, with the system of the present invention, location of leaks in the primary system, and repairs in both the primary and secondary systems, are easily accomplished.

To these ends, the present invention uses divided secondary containment joints formed by a plurality of joint sections, preferably two, having relatively wide abutting surfaces at the parting lines of the joint, with internal sealing passages defined between these abutting surfaces and additional internal sealing passages formed as grooves in the internal surfaces of the pipe sockets to overlie the ends of the pipes in the sockets. In the illustrative embodiment, the socket passages communicate with the passages in the abutting surfaces to form a continuous seal around the interior of the pipe joint.

For assembly, the joint sections are secured together around the secondary containment pipes with the latter in place over a primary pipe system, and adhesive sealing cement is injected into both sets of passages to form a fluid-tight seal completely surrounding the interior of the joint, and are held together until the cement has set. The preferred manner of securing the joint together is to form the wide abutting surfaces as the opposed sides of laterally projecting flanges on the joint sections, and to clamp these flanges mechanically together with clips that can be left in place at least until the cement has set. Injection of the adhesive sealing cement is accomplished through spaced ports opening into the passages at selected points, herein in the socket grooves adjacent their intersections with the flange passages, so that cement flows into both sets of passages from the ports. The preferred joint material is transparent, and the preferred cement is of a contrasting color, such as white, to permit visual observation of the flow of cement into and along the passages. Interfitting surfaces align the joint sections and form dams for restricting the cement to the passages, and spillover areas are provided for receiving excess cement and reducing the escape of cement from the joint.

Similarly, the present invention uses longitudinally divided secondary containment pipes that are formed by a plurality of elongated pipe elements, preferably two, that are fitted together in edge-to-edge relation, and have interfitting coupling means on their abutting edges for latching the elements together, and means defining internal sealing passages extending along the abutting edges to be filled with adhesive sealing cement to seal and secure the edges.

In one embodiment, preferred for pressurized systems, tongue-and-groove elements form the coupling means, and internal sealing flaps on the pipe elements extend across the parting lines into abutting engagement with the opposite pipe elements and form sealing passages internally overlying both coupling means. Cement is injected into these sealing passages from longitudinally spaced ports on each side, and not only fills the passages to bond the flaps to the pipe elements but also flows into the tongue-and-groove elements to adhesively secure and seal them as well. The flaps are held against yielding away from the internal walls of the pipe elements by internal ribs along the edges of the elements, these ribs being shaped and positioned to press the free edges of the flaps tightly against the walls of the elements as the elements are latched together. The pipe elements also are made transparent to permit visual observation of the flows of cement along the passages to insure completion of each seal.

The method of the invention comprises the steps of providing secondary containment components, both joint sections and pipe elements, assembling them around the joint and pipe components of a primary pipe system and mechanically coupling them together in a temporary fashion, injecting the adhesive sealing cement in the joint sections to a form complete seals surrounding the interior of the joint and in the pipe elements to form the side seals, observing the completion of each seal as the injection proceeds, and maintaining the mechanical coupling of the elements at least until the cement has set, and preferably for a substantial curing period as well. In fact, with inexpensive clamps such as C-shaped clips pressed onto the flanges, the mechanical couplings can remain indefinitely as reinforcement for the cemented joints.

Other aspects and advantages of the invention will become apparent from the following detailed description, taken in conjunction with the accompanying drawings.

Brief Description of the Drawings

FIG. 3 is an enlarged fragmentary top plan view of the components in FIG. 1;

FIG. 4 is a further enlarged fragmentary cross-sectioned view taken substantially along the line 4—4 of FIG. 3, in the direction of the arrows thereon;

FIG. 5 is an enlarged fragmentary cross-sectional view taken substantially along the line 5—5 of FIG. 3, with a primary component broken away for clarity of illustration.

FIG. 8 is an enlarged fragmentary perspective view of a secondary containment pipe in assembled relation with a primary containment pipe, with an illustrative spacer holding the two pipes in generally coaxial relation;

FIG. 9 is an enlarged cross-sectional view taken substantially along line 9—9 of FIG. 8;

FIG. 10 is an enlarged exploded perspective view of the secondary containment pipe in FIG. 8, with the two pipe elements separated;

DETAILED DESCRIPTION OF THE PRESENTLY PREFERRED EMBODIMENT

Figure 1:
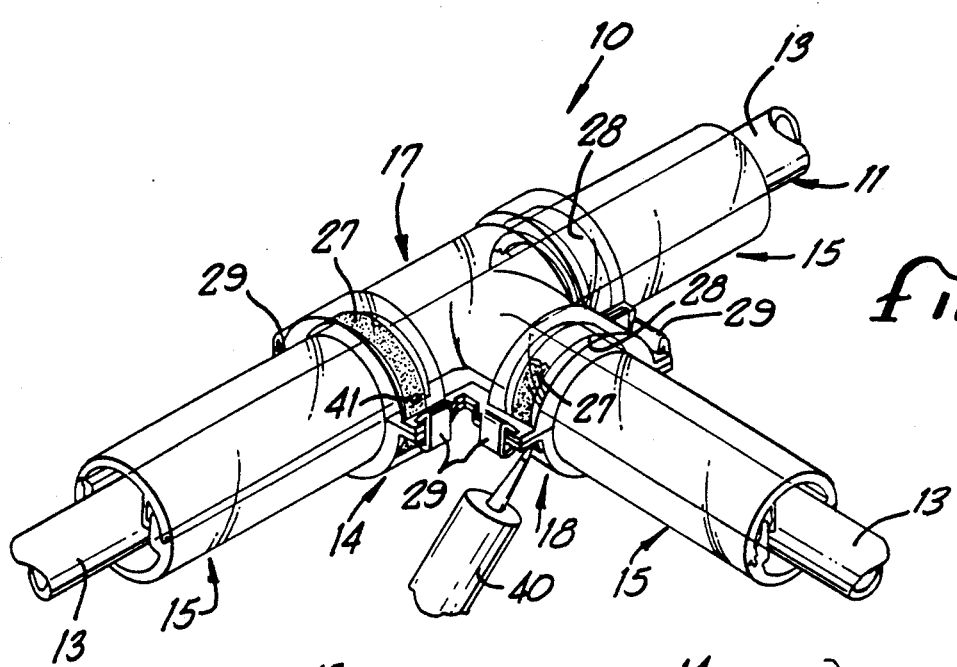
FIG. 1 is a fragmentary perspective view of portions of the components of a secondary containment system in accordance with the present invention, shown in the process of installation over corresponding portions of components of a primary containment system, the illustrative joint being a "Tee" fitting.

As shown in the drawings for purposes of illustration, the invention is embodied in components of a secondary containment system, indicated generally by the reference number 10, for a primary containment system 11 that comprises a "Tee" joint 12 joining three primary pipes 13. The primary components may be of totally conventional construction and form no part of the present invention, so they are shown only generally herein.

The illustrative secondary containment components are a "Tee" joint 14 for surrounding the primary Tee 12, and three secondary containment pipes 15 for surrounding the primary pipes 13, these pipes being identical except, perhaps, in their lengths, which will be determined by the lengths of the primary pipes that they surround. While various materials may be used, the preferred materials are thermoplastics, and in particular PVC.

The illustrative system is for a four-inch secondary containment system adapted for use over smaller primary systems. In addition to a three-pipe junction of the type shown herein, the system of the present invention is adaptable to a full range of the conditions that are found in a primary containment system. These conditions will include the connecting of two primary pipes with a right-angle joint, the secondary containment joint in the form of an elbow or bend for such a primary joint being shown in FIG. 7 herein. Also included but not specifically illustrated herein will be a simple sleeve with aligned, oppositely opening sockets for coupling two secondary containment pipes in aligned, end-to-end relation, a forty-five degree elbow, lateral or "Y" joints, and size-changing joints, as well as traps, clean-outs, caps and other elements of well-known nature. From the following detailed description, the manner of adapting the invention to these conditions will be readily apparent to those skilled in the art.

Figure 2:
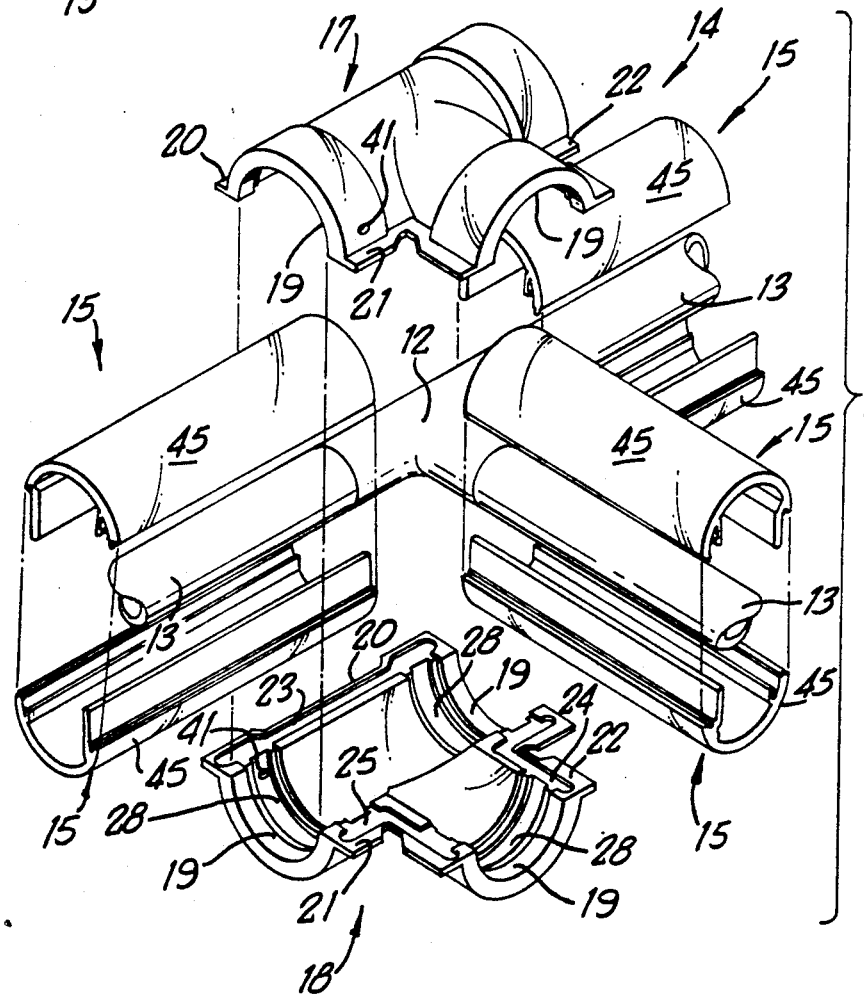
FIG. 2 is an exploded perspective view of the components in FIG. 1, shown in slightly diagrammatic form with the secondary containment components separated from the primary containment components.

As shown most clearly in FIG. 2, the preferred embodiment of the secondary containment joint 10 comprises two joint sections 17 and 18, which typically are molded parts, adapted to be disposed around the primary joint 12 and fitted together in abutting edge-to-edge relation to enclose the primary joint and define three pipe sockets 19 overlying the pipe sockets in the primary joint. While split pipe joints have existed in the past, such as in U.S. Pat. No. 4,786,088 or in the Harrington system previously mentioned, these split pipe joints have lacked truly practical and effective ways for assembly around the primary joint. For example, the two referred to use hot welding, or butt welding, to join the edges.

In accordance with a primary aspect of the present invention, the sections 17 and 18 of the secondary containment joint 14 are provided with relatively wide abutting surfaces at the parting lines of the joint, herein on laterally projecting flanges 20, 21 and 22 on opposite sides of a central parting plane through the axes of all three sockets of the joint. These flanges have the effect of thickening the abutting edges of the two joint sections, provide easily accessible clamping points for use in a manner that will be described, and contain on their opposed, abutting surfaces sealing grooves 23, 24 and 25 that are enclosed between the abutting surfaces in the assembled joint, forming sealing passages that are filled with adhesive sealing cement 27 (see FIG. 1) to secure and seal the joint sections together.

Figure 6:
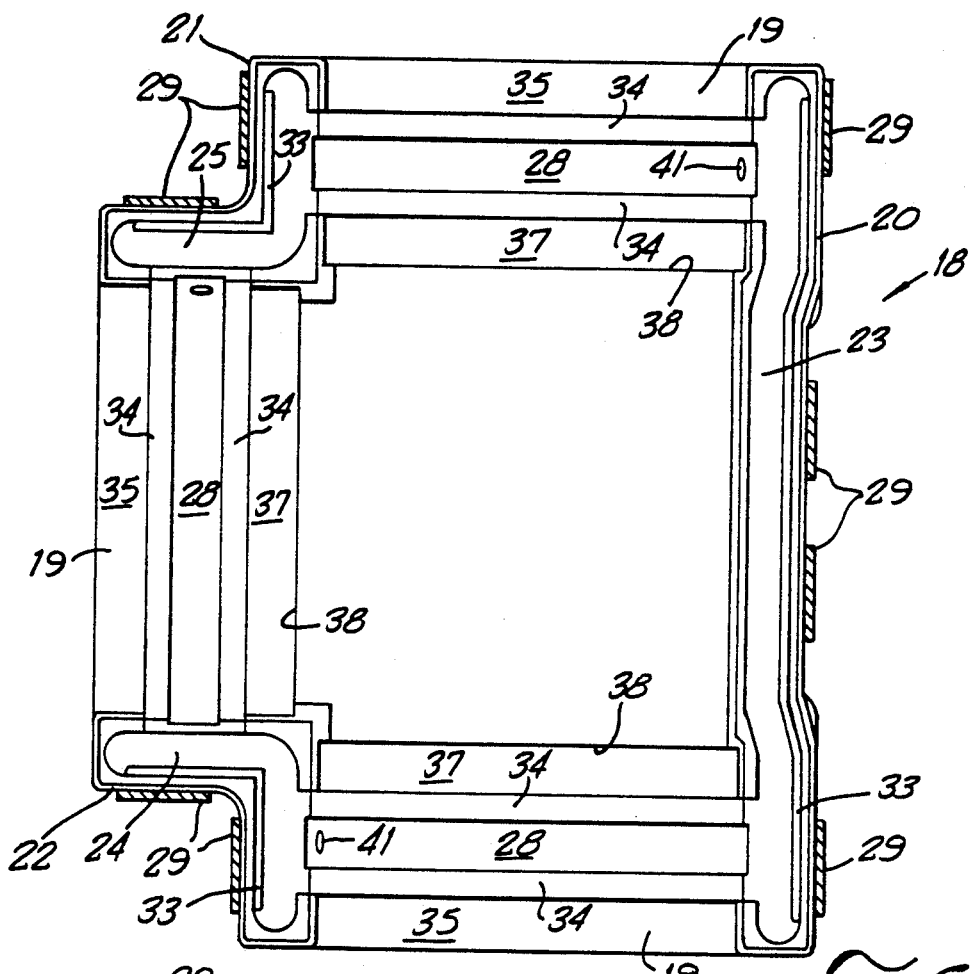
FIG. 6 is a further enlarged fragmentary cross-sectional view, taken substantially along line 6—6 of FIG. 4.

In addition, each joint section 17, 18 has, in the inside wall of each of the halves of the socket 19, a sealing groove 28 that extends around the socket half between the flanges on opposite sides of the socket half, as can be seen most clearly in FIGS. 2 and 6. These sealing grooves open at their ends into the sealing grooves 23, 24 and 25 in the flanges. When the end portion of a secondary containment pipe 15 is fitted snugly in one of the sockets, the grooves 28 in the socket halves are aligned with each other and are closed on their open sides by the pipe, thereby forming a sealing passage encircling the end of the pipe and communicating with the passages formed by the grooves between the flanges. When a pipe 15 is fitted in each socket and the passages around the sockets and between the flanges are filled with adhesive sealing cement, the cement forms a continuous, uninterrupted seal totally surrounding the interior space of the joint 14, completing the assembly of the joint and its connected pipes 15.

Various means may be used to secure the joint halves 17, 18 together prior to cementing, but a presently preferred means is a set of simple metal clips 29 (FIGS. 1, 3, 4 and 5) formed by C-shaped strips of relatively stiff metal having ends that normally are spaced apart a distance slightly less than the combined thickness of the two abutting flanges, for clamping engagement with those sides. With the flanges together, a clip can be forced partially over the ends of the flanges and then driven into place by a suitable tool such as a hammer (not shown). As can be seen in FIGS. 1 and 3, a clip is driven onto each end of each flange 21, 22, and two additional clips are driven onto the central portion of the longer flange 20 along the long side of the joint. Thus, the flanges form oppositely, facing clamping surfaces as well as providing thickened abutting surfaces. External ribs (not shown) may be formed on the flanges to provide the clamping surfaces and to retain the clamps against sliding laterally off the flanges.

When the flanges are clamped together, the abutting surfaces of the flanges 20, 21 and 22 close and substantially seal the passages formed between the flanges, as best shown on the left in FIG. 5. The grooves 23, 24 and 25 forming the passages are surrounded by opposed flat surfaces, except at the entry openings 30 into the grooves 28 in the sockets, as shown in FIG. 4. Along the outer margins of the flanges, interfitting rib-and-groove elements 31 and 32 are formed to provide opposed laterally facing locating surfaces for the joint sections. As can be seen in FIG. 4, the lower section has an upwardly extending rectangular rib 31 along the outer edge of the left-hand flange 21 and a rectangular groove 32 along the outer edge of the right-hand flange 20, and the upper joint section has the reverse, a left-side groove 32 receiving the rib 31 and a right-side rib 31 fitting downwardly into the groove 32. The sides of these elements provide the laterally facing locating surfaces, which extend along all three flanges for optimum locating of the two joint sections.

Spillover space is provided along the outer margins of the passages formed by the grooves 23, 24 and 25 to reduce the tendency of the adhesive sealing cement to escape between the abutting surfaces around the passages. In the flange passages, the spillover space is provided by relatively deep and narrow channels 33 along the outer margins of the grooves, constituting only a small amount of the groove width, less than one-quarter in this instance. These channels allow excess cement to spill into the deeper "wells" along the margins, and reduce the tendency to press through between the flanges.

In a slightly different fashion, relatively shallow spillover spaces or grooves 34 are formed on both sides of the central, deeper grooves 28 that are the main bodies of the sealing passages in the pipe sockets 19. As can be seen most clearly in FIG. 5, these spaces permit cement to flow out of the main grooves 28 toward the opposite ends of the socket, but are shallower than the central grooves so that the primary flows are along the central grooves. The shallow spillover grooves are bounded by walls 35 and 37 of the socket that tightly engage the pipe 15, the end of which should be seated against an internal shoulder 38 (FIG. 5) at the inner end of the socket. With properly sized and closed parts, escape of cement from these grooves is minimized.

It will be realized that dimensions will vary with the circumstances of a particular situation, including materials used and tolerances permitted. As an example for the presently preferred embodiment only, a suitable adhesive sealing cement is the plastic pipe cement sold as "719 for PVC" under the brand name "Weld-On" by Industrial Polychemical Service ("IPS"), Gardena, Calif. This product is provided as a white, heavy bodied thixotropic (paste-like) fluid. Another suitable cement that has the advantage of a shorter curing time is a thermosetting cement, such as that sold by IPS as "Weld-On" 10. With these cements, suitable dimensions of the total thickness of the main passages formed by the grooves 23, 24 and 25 are on the order of about 0.030 of an inch (0.015 in each flange), and a suitable total depth for the wells 33 is about 0.050 of an inch (0.025 in each flange). The main grooves 28 in the sockets 19 may be on the order of about 0.050 of an inch, with the shallow spillover portions 34 on the order of about 0.030 of an inch. Again, dimensions may be varied with circumstances, and it is advisable to derive optimum dimensions empirically for each new set of circumstances.

Injection of the adhesive sealing cement into the two sets of passages is accomplished with a suitable tool, such as a manually operated gun 40 as shown in FIG. 1, through ports 41 that are located at appropriate places for easy filling of the passages, the ports preferably having enlarged outer ends 42 for engagement with the gun. In the illustrative "Tee" joint, the ports are formed as drilled and countersunk holes through the semi-circular walls of the pipe socket, one (see FIG. 4) being angularly spaced above the parting plane on one side and another being spaced below the parting plane on the other side. As shown in FIG. 4, the port holes herein are drilled in thickened "dimples" 43 on outer walls of the sockets, a distance in the range of ten to twenty-five degrees from the parting plane, the presently preferred spacing being approximately seventeen degrees which has been found to be close enough to obtain good flows of cement in both directions from the port. One flow is around the socket 19 away from the adjacent flanges, and the other flow is toward the adjacent flanges and into and along the passage therein. Two ports formed on opposite sides of each socket, in the manner illustrated in FIG. 4, have been found to provide good filling of all of the passages in the "Tee" joint illustrated herein. It will be apparent, however, that additional ports may be formed in any passage areas that the flow does not readily reach, simply by drilling additional holes through an outer wall of the passages areas. Also, if the cement should set up before filling is complete (for example, if the operation is interrupted and then resumed), an additional port can be drilled in the unfilled area as a corrective measure, in the field.

It can be seen that proper flow of cement along the passages formed by the grooves 23, 24 and 25 will require escape of the air from the passage in advance of the flow. The passages are vented, at least initially, by the other ports, so air will not be trapped to obstruct the flow. When all of the other ports have been closed, the cement still can be forced to flow into the final area to be filled because there is some venting of the passages through clearances that inherently exist in production pipe parts. The seals between the parts typically are not air-tight, and have to be only close enough to contain the relatively thick cement, without objectionable escape. If there should be some leakage, however, it can be cleaned up by wiping at the end of the installation process.

Figure 7:
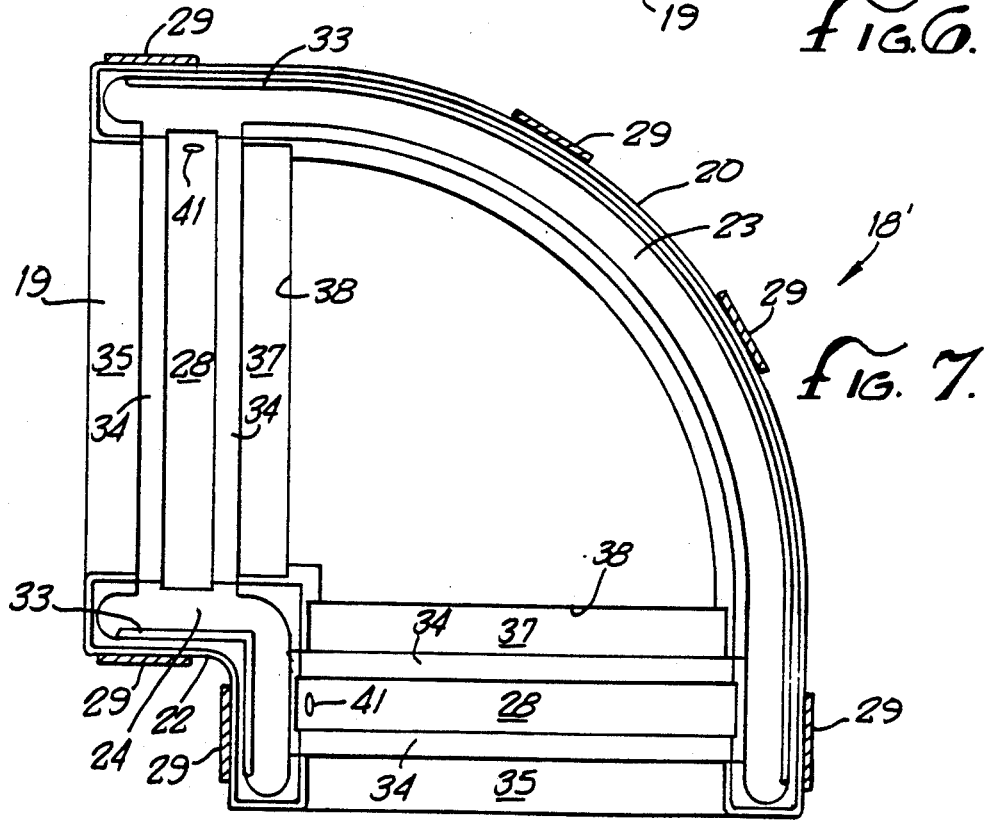
FIG. 7 is a view similar to FIG. 6 but showing an elbow fitting.

Shown in FIG. 7 is another joint section 17′ a right-angle secondary containment joint, simply to illustrate the changes that may be made to produce a joint of a different standard configuration. The two half sockets 19 open out of the joint in directions that are ninety degrees apart, just as do two of the half sockets in FIG. 6. Thus, the flange 21 on the lower left in FIG. 7 may be the same as the lower left flange 21 in FIG. 6, while the flange 20 on the opposite side of the joint section is arcuate, and has an arcuate groove 23 therein. In all other important respects, this joint section 17′ is the same as the joint section 17 in FIG. 6, so corresponding parts are indicated with the same reference numbers.

The Secondary Containment Pipes

To permit the installation of the secondary containment system 10 around the primary pipe system 11 without need to disconnect its various primary components, the pipes 15 of the secondary containment system also are divided longitudinally into a plurality of elongated pipe elements 45, preferably two, disposed on opposite sides for a central dividing plane, to be fitted together around the pipes 13 of the primary system. Although it would be possible to provide thickened abutting surfaces on the pipe elements, and to use a variation of the flanged joints for the pipes, the need for flangeless ends for insertion in sockets and other practical considerations including length, manufacturing cost and complexity, make it desirable to provide a somewhat different approach to the design and construction of the secondary containment pipes.

In accordance with this aspect of the present invention, the pipe elements 45 are formed with interfitting coupling means along their abutting edges for mechanically latching the elements together, and also defining internal sealing passages 47 extending longitudinally along the coupling means to receive injected adhesive sealing cement for securing and sealing the pipe elements. In the presently preferred embodiment shown in FIGS. 4 and 8 through 10, the coupling means include snap-interlocking tongue-and-groove elements 48 and 49 along the abutting side edges, and elongated internal flaps 50 that are integrally joined to the inner surfaces of the pipe elements along one side edge of each longitudinal edge joint, and extend across the dividing plane and along the inside surface of the adjacent edge portion of the other pipe element. The flaps are spaced from the inside pipe surfaces along the abutting longitudinal edges to define the sealing passages 47, and abut against the inside surfaces along a line 51 adjacent their free edges.

The interlocking tongue-and-groove elements comprise a rib 48 on one edge of each pipe element 45 having an enlarged, slightly laterally offset free edge portion, and a groove 49 in the abutting edge of the other pipe element 45, shaped and positioned to receive the rib with a snap-latching fit. For this purpose, the grooves have entry sides slightly narrower than the free edge portions of the ribs, to receive the ribs with an interference fit. The two ribs of a pipe extend across the dividing plane in opposite directions, and latch the pipe elements mechanically together, independent of the sealing cement.

The internal flaps 50 similarly project in opposite direction across the dividing plane, herein being formed along the same side edges of the pipe elements as the grooves 49, and are offset inwardly from these side edges. Herein, the free edge 52 of each flap is shaped as a curved bead on the outer side of the flap, and means preferably are provided for pressing the beads into firm sealing engagement with the pipe surfaces, to hold leakage of cement to a minimum. In the preferred embodiment, this pressing function is performed by an internal rib 53 having an L-shaped cross-section and defining an internal trough 54 opening toward the adjacent edge of the pipe element 45 and positioned to receive the free edge of the flaps 50 as the pipe elements are pressed together, and to press the bead 52 firmly against the inside pipe surface.

As shown in FIGS. 8 through 10, injection ports 55 are spaced along the pipe elements to open into the internal sealing passages 50 through the sidewalls of the pipe elements. These are drilled holes having enlarged outer ends for engagement with the cement injection tool and are spaced according to the circumstances. In the presently preferred embodiment, using the previously mentioned Industrial Polychemical Service cements and with passages having a width in the range of 0.25 to 0.75 of an inch, and a gap or thickness in the range of 0.015 to 0.05 of an inch, a satisfactory longitudinal spacing of ports is on the order of eighteen inches. As with the pipe joints, the preferred material is transparent PVC, so that the flow of the white cement along the passages can be observed to insure that sealing is complete.

The clearances in the interlocking tongue-and-groove elements 48 and 49 are shown in a somewhat exaggerated fashion in FIG. 9, to emphasize the fact that sealing cement that is injected into the internal passages 47 under moderate injection pressure not only will flow along the passages between the ports but also will flow into the grooves 49 and around the ribs 48. This will reinforce the latching of the pipe elements 45 together, and, when the cement has set, will result in a virtually permanent joinder of the pipe elements together into a functionally unitary piece.

Thus, the invention provides an effective secondary containment pipe 15 that can be made of extruded parts 45 and easily assembled around the pipes 13 of a primary pipe system 11. Typically the pipes will be produced with a standard wall thickness on the order of 0.162 of an inch in a four-inch pipe, and in correspondingly greater wall thicknesses for large pipes.

The Spacers

Shown for purposes of illustration in FIGS. 8 and 9 is a spacer 57 of a type that is basically conventional in secondary containment systems, for supporting an outer pipe 15 in generally coaxial relation on an inner pipe 13. This spacer comprises an inner arcuate body 58 of resiliently flexible material extending through an arc greater than a half circle, leaving a gap on one side, and a plurality of radial fingers 59 projecting outwardly from the body, with the outer ends of the fingers disposed on a common circle. The inside diameter ("I.D.") of the body is sized to fit the outside diameter ("O.D.") of a given size of primary pipe, such as a two-inch pipe, and the common circle of the tip is sized to fit the I.D. of a given secondary containment pipe, such as a four-inch pipe. For installation, the spacer body is flexed to open the gap to fit over the primary pipe, and then is released to return to its original shape and close around the pipe. Then the secondary containment pipe is assembled around the primary pipe, and over an appropriate number of spacers to support the length of the secondary pipe, the fingers 59 engaging the I.D. of the secondary pipe to hold it in position around the primary pipe.

It will be apparent that precise fits will not be necessary, the important function being the support of the two pipe systems in generally coaxial relation. In practice, it is anticipated that secondary containment systems will be provided in a limited number of sizes, and spacers will be provided to fit all of the various sizes of primary pipes to be covered. For example, it is believed that two sizes of secondary containment pipes, four-inch and six-inch, will handle all sizes of primary pipes from four-inch down. Secondary pipes larger than six-inch can be provided, when circumstances justify the production costs that are involved.

It is to be noted that the support of the weight of these pipe systems is a matter of concern, and must be given appropriate attention in the design of external supports, as well as in the design of the spacers 57. The radial fingers 59 of the spacers must have sufficient strength to sustain the load to which they are subjected. Herein, three angularly spaced fingers are shown, but a greater number may be provided for greater load-carrying capacity.

Figure 11:
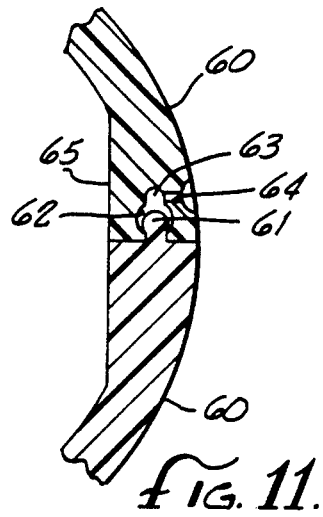
FIG. 11 is an enlarged fragmentary cross-sectional view similar to a portion of FIG. 9, but showing an alternative embodiment of the invention.
Figure 12:
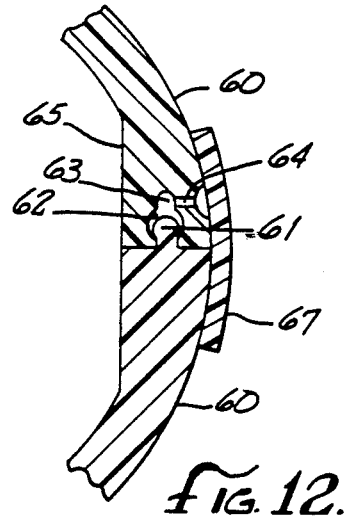
FIG. 12 is a view similar to FIG. 11 showing another alternative embodiment.
Figure 13:
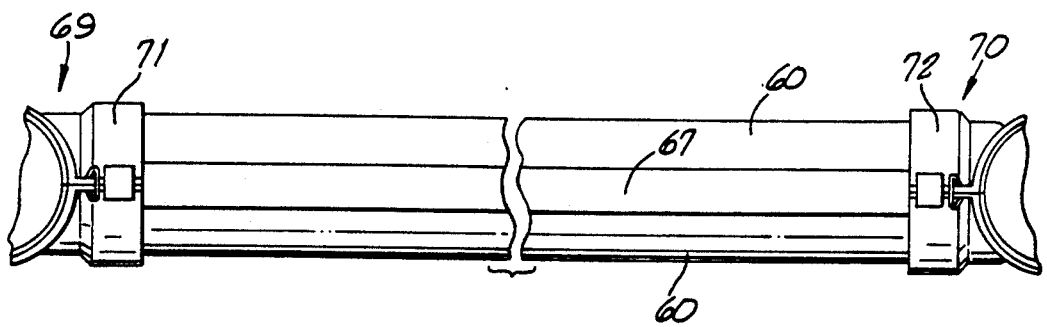
FIG. 13 is a fragmentary side elevational view, on a reduced scale, of a secondary containment pipe of the type illustrated in FIG. 12, extending between two secondary containment pipe joints.

Alternative Pipe Elements, FIGS. 11 through 13

An alternative design for the pipe elements is shown in FIGS. 11 through 13. In FIG. 11, the abutting edges of the pipe elements 60 are coupled by interlocked tongue-and-groove elements 61 and 62, the tongue element 61 being a rib with an enlarged, rounded free edge portion, and the groove element 62 being a groove having a restricted open side narrower than the rounded portion of the rib and an enlarged inner portion defining an internal sealing passage, which is extended inwardly at 63. Ports 64 open into the passage through the sidewall of the pipe element 60, the sidewalls preferably being thickened adjacent the abutting edges by adding material on the inner sides of the elements at 65.

When the passages 62, 63 of such pipe elements 60 are filled with adhesive sealing cement, as in the preferred embodiment, the cement securely joins the elements and seals the abutting edges. Some leakage of cement injected under pressure around the ribs 61 and even between the pipe edges can be expected. This configuration is more suitable for use in a secondary containment system for a drainage system than for a pressurized system.

For a primary system that contains fluid under pressure, it may be desirable to reinforce the secondary containment pipe of FIG. 11, in the manner shown in FIG. 12, by adhesively securing a reinforcing strip 67 to the outer sides of the pipe elements 60 over the longitudinal joint between the abutting edges. Such a strip should have a concavely curved inner side 68, for good sealing engagement with the pipe elements as the cement sets and cures. The outer side need not be curved, but is shown herein as curved because of the transverse curvature of the entire strip.

A reinforcing strip 67 of the type shown in FIG. 12 is shown in FIG. 13 on a section of a secondary containment system, between two secondary containment joints 69 and 70. The ends of the strip are fitted as close by as possible between the sockets 71 and 72 of the two joints that hold the pipe, for full reinforcement of the pipe between the joints.

The Method of Assembly

The method of assembly of a secondary containment system 10 in accordance with the present invention should be apparent from the foregoing detailed description, but a brief summary will be useful to provide a full understanding. It will be assumed that the system is to be applied on a retrofit basis to an existing primary system 11, as illustrated in FIGS. 1 and 2, but it is to be understood that the two systems may be assembled at the same time, if necessary.

As a first step, secondary containment pipe joint and pipe element components of the foregoing types are provided in an appropriate size to fit over the components of the primary system, and in appropriate numbers and lengths, depending upon the characteristics of the primary system. Spacers 57 are provided to fit over the primary pipes 13 and into the secondary pipes 15, and are positioned along the primary pipes to receive the secondary pipes. The latter typically will be supplied in standard lengths, and may be cut to fit special requirements.

With a set of spacers in place on a primary pipe 13, the elements 45 of a secondary pipe are positioned on opposite sides of the primary pipe, as illustraed in FIG. 2, with their ends positioned adjacent to the ends of the primary pipes, and are pressed together around the primary pipe until the coupling means 48, 49 have become engaged to hold the pipe elements together. Then the remaining secondary pipes around a given primary joint are assembled in the same way, and the secondary pipes are ready for cementing. This may be done now, or delayed to be done as a part of an overall cementing operation when the secondary containment joint 14 is in place.

To install the joint 14, the two joint sections 17 and 19 are positioned on opposite sides of the primary joint 12 and in overlying relation with the ends of the assembled secondary pipes 15, and are brought together over the primary joint and around the secondary pipes. The interfitting ribs and grooves 31 and 32 assist in aligning the joint sections as they come together.

Then the clips 29 are applied to the flanges 20, 21 and 22 of the joint sections, as shown in FIGS. 1 and 3. It may be desirable to apply temporary clamps, such as two or more pairs of locking pliers (not shown), to hold the joint sections together as the clips are applied, and to remove the pliers when the joint is secure. The secondary pipes should be properly seated in the sockets 19 of the joint during this portion of the process.

With the secondary containment joint 14 and the associated pipes 15 in place and clamped and latched together, adhesive cement is applied through the ports 41 and 55 to fill the sealing passages formed by the grooves 23, 24, 25 and 28 in the joint and the passages 47 in the pipes, along with the clearances in the coupling means 48, 49. With the filling tool 40 inserted in one of the ports 41, cement is injected into the socket groove 28 to flow around the socket in both directions and into and along the adjacent flange passages, generally half way in each direction toward the nearest other port. The progress of the cement along the passages can be observed during the process, and injection pressure can be controlled to change the rate of flow. When the areas to be filled from one port have been filled, the injection tool is moved to the next port, and then the next, until all of the passages in the sockets and between the flanges have been filled, as can be confirmed by visual observation of the cement through the transparent plastic.

The clips 29 should be left in place, at least until the cement sets and preferably at least for an additional curing period determined by the characteristics of the cement. The PVC pipe cement gains a substantial amount of strength in a matter of several hours, and at least forty-eight hours of curing is recommended before any substantial loading is applied.

Similarly, the flow of the adhesive cement in the passages 47 of the secondary containment pipes 15 can be visually observed to insure that a complete, continuous, fluid-tight seal is provided. Similar setting and curing times are to be allowed before loads are applied to the pipes.

In this manner, the joints and runs of pipe in the primary pipe system are enclosed successivley in secondary containment components until the entire secondary system is in place. The steps are substantially the same with the various embodiments of the invention, the differences being only in structural details of the components.

Conclusion

From the foregoing, it will be evident that the present invention provides a novel secondary containment pipe system and method of installation that are significant improvements over the prior systems and components that have been proposed, providing a functionally effective secondary containment system that is relatively simple to install and that facilitates confirmation of complete and effective sealing of the joints through visual observation of the cement. The components are capable of production at reasonable cost, using standard materials and production processes, the result being a highly effective secondary containment system that is cost effective as well. Further, visual location of leaks is possible, and interstitial monitoring with automatic leak-detection systems (not shown) can be included, and repairs can be made with relative ease, both in the primary system and, if needed, in the secondary system.

It also will be evident that, while a preferred embodiment and certain alternative embodiments have been illustrated and described in detail, various modifications and changes may be made without departing from the spirit and scope of the invention, which is to be limited only by the appended claims and the breadth and equivalents to which they are entitled.

We claim as our invention:

1. A secondary containment system for a primary pipe system having straight primary pipes connected by a primary pipe joint, said secondary containment system comprising:

longitudinally divided secondary containment pipes larger than and disposed around the primary pipes and each being made up of longitudinal pipe elements free of external protrusions fitted together in edge-to-edge relation to form an enclosing flange-free sheath, said elements having abutting longitudinal edges formed with interfitting coupling means for mechanically latching said elements together, and also defining first internal sealing passages extending longitudinally along said coupling means, and adhesive sealing cement substantially filling said sealing passages and adhesively securing said coupling means together to join said pipe elements into substantially permanent secondary containment pipes;

said pipe elements having ports spaced along said passages for injection of said cement into the passages after assembly and mechanical coupling of the elements;

and a secondary containment joint connecting said secondary containment pipes and including joint sections adapted to be disposed around the primary pipe joint on opposite sides of a central parting plane and fitted together in abutting edge-to-edge relation to enclose the primary joint and define pipe sockets receiving end portions of the secondary containment pipes, said central dividing plane extending through the longitudinal axes of said sockets, and each of said joint sections having external connecting flanges projecting laterally outwardly from the section along said plane and extending along the abutting edges of the section, in opposed, abutting relation with the connecting flanges of the other joint section, connecting means clamping said flanges together to join said joint sections together as the secondary containment joint, means defining second internal sealing passages between said flanges extending along the sides of the secondary containment joint and also defining third internal sealing passages extending around said pipe sockets between the joint and said secondary containment pipes, said second and third passages communicating with each other on opposite sides of each socket to define a continuous seal-forming space between said joint sections, and adhesive sealing cement substantially filling said continuous seal-forming space in second and third passages and forming an uninterrupted seal adhesively securing said flanges together and holding said secondary containment pipes in said sockets;

said joint sections having ports spaced along the passages therein for injection of said cement into said second and third passages when the joint sections are clamped together around said secondary containment pipes, thereby to complete and seal the secondary containment system around that primary pipe joint and the connected primary pipes.

2. A secondary containment system as defined in claim 1 wherein said coupling means comprise interfitting tongue-and-groove elements formed on said longitudinal edges to engage each other with a mechanical locking fit, and including clearances within the groove elements around said tongue elements constituting parts of said first internal sealing passages.

3. A secondary containment system as defined in claim 2 further including external reinforcing strips adhesively secured to said pipe elements and externally overlying the joined abutting edges.

4. A secondary containment system as defined in claim 1 wherein each of said pipe elements has an internal sealing flap along one side edge extending over the adjacent pipe element and into internal abutting engagement therewith, each flap cooperating with the adjacent pipe element to define part of said first internal sealing passages.

5. A secondary containment system as defined in claim 4 further including detent means on the inside surface of each pipe element positioned to engage and hold the sealing flap of the adjacent pipe element to block inward deflection of the flap by pressure in the sealing passages during injection of cement.

6. A secondary containment system as defined in claim 5 wherein said detent means are continuous internal grooves in said elements for receiving said flaps.

7. A secondary containment system as defined in claim 5 wherein said coupling means comprise loosely interfitting tongue-and-groove elements formed on said longitudinal edges and including clearances within the groove elements constituting additional parts of said first internal sealing passages, said clearances communicating with the spaces between said flaps and the inside surfaces for filling of all of the passages with cement through the ports in said pipe elements.

8. A secondary containment system as defined in claim 7 wherein each of said second passages has an enlarged outer side portion constituting a well for overflow of cement from the main portion of the passage.

9. A secondary containment system as defined in claim 1 wherein said secondary containment pipes are divided longitudinally along a central parting plane into two elements constituting pipe halves, each pipe half having an internal sealing flap along one side edge extending across the parting plane into abutting engagement with the inside surface of the other pipe half to form reinforcing seals, portions of said flaps being spaced from the inside of the other pipe half to define spaces of said first sealing passages.

10. A secondary containment system as defined in claim 9 wherein said second passages are formed by aligned grooves in the abutting surfaces of the two sets of connecting flanges.

11. A secondary containment system as defined in claim 1 wherein said sockets of said secondary containment joint are of circular cross-section and are divided along said central parting plane into semi-circular socket halves, each joint section having a set of connecting flanges lying on one side of the parting plane and portions of said second sealing passages along said parting plane.

12. For use in a secondary containment system for a primary pipe system including a primary pipe joint of selected shape in combination with secondary containment pipes of generally circular cross-sectional shape to be disposed around primary pipes, a secondary containment joint comprising two side-by-side joint sections fitted together on opposite sides of a central dividing plane and each having at least two socket ends of semi-circular cross-sectional shape having concave inner surfaces co-operating with the other pipe section to define at least two pipe sockets for receiving the ends of secondary containment pipes, each of said joint sections having:

a set of laterally projecting flanges lying along said dividing plane and having locating surfaces facing toward said plane and abutting against the locating surfaces of the other joint section, shallow first grooves in said flanges spaced inwardly from the laterally outer edges thereof and extending along said flanges from adjacent the end of each socket end to the adjacent socket end on the same side of the joint section, said grooves defining first sealing passages between said flanges, shallow second grooves in the concave inner surfaces of said socket ends in the pipe sockets thereof extending across each socket end from the first sealing passage in the flange on one side of the joint section to the second sealing passage in the flange on the other side of the joint section and opening at each end into one of the first passages, said second grooves being positioned in said sockets to be substantially closed on one side by the end portion of a containment pipe on the socket, thereby to form second sealing passages encircling each of said sockets and communicating with said first grooves, and means defining ports opening into said sealing passages for injection of sealing cement therein to form a continuous adhesive seal surrounding the interior of the containment joint when a secondary containment pipe is fitted in each pipe socket.

13. A secondary containment joint as defined in claim 12 wherein said flanges have locating surfaces surrounding said first grooves except at the entry into said second grooves.

14. A secondary containment joint as defined in claim 13 further including spillover grooves forming wells in the bottoms of said first grooves along the laterally outer margins thereof.

15. A secondary containment joint as defined in claim 14 wherein each of said passages formed by said first grooves have a depth of about 0.030 inch and a spillover groove having a depth of about 0.010 inch beyond the bottom of the groove.

16. A secondary containment joint as defined in claim 12 wherein the passages formed by said second grooves have a depth of abount 0.050 inch.

17. A secondary containment joint as defined in claim 16 wherein each of said second grooves has a shallower spillover groove on each side.

18. A secondary containment joint as defined in claim 17 wherein said spillover grooves have a depth of about 0.030 inch.

19. A secondary containment joint as defined in claim 12 wherein said flanges have, along their laterally outer edges, opposed laterally facing locating surfaces holding said joint sections in laterally aligned relation.

20. A secondary containment joint as defined in claim 19 wherein said opposed, laterally facing locating surfaces are side walls of interfitting rib-and-groove elements.

21. A secondary containment joint as defined in claim 20 wherein each joint section has a rib element on the flange on one side of the joint section extending across the central dividing plane, and an aligned groove element in the flange on the other side of the joint section for receiving the rib element.

22. A secondary containment joint as defined in claim 12 wherein said joint defines three pipe sockets for connecting three secondary containment pipes.

23. A secondary containment joint as defined in claim 22 wherein said joint is a "Tee" having two aligned pipe sockets on a common axis and a third socket on one side at a right angle to the common axis.

24. A secondary containment joint as defined in claim 23 wherein each of said joint sections has one generally straight flange on the side opposite the socket end of said third socket, and two right-angle flanges on the other side, extending from the socket ends of the aligned sockets to opposite sides of the socket end of the third socket.

25. A secondary containment joint as defined in claim 22 wherein said joint defines two pipe sockets for connecting two secondary containment pipes.

26. A secondary containment joint as defined in claim 25 wherein said sockets have axes that are disposed at an angle to each other.

27. A secondary containment joint as defined in claim 26 wherein each of said joint sections has an arcuate flange along one side and a right-angle flange along the other.

28. A secondary containment joint as defined in claim 25 wherein said joint is an elbow, and said sockets are disposed at a right angle to each other.

29. For use in a secondary containment system for a primary pipe system including a primary pipe joint of selected shape in combination with secondary containment pipes of generally circular cross-sectional shape to be disposed around primary pipes, a secondary containment joint comprising a plurality of joint sections adapted to be fitted together around the primary pipe joint in abutting edge-to-edge relation to enclose the primary pipe joint and define pipe sockets for receiving end portions of the secondary containment pipes, said joint sections having part-circular sockets defining portions of sockets for receiving the secondary containment pipes, and opposed side edges disposed in abutting relation;
  means defining first internal sealing passages between said side edges along the sides of the secondary containment joint between said abutting side edges;
  means defining second internal sealing passages extending around said pipe sockets in said joint sections;
  and means defining at least one injection port for introducing adhesive sealing cement into and substantially filling said first and second passages when secondary containment pipes have been inserted in the sockets, thereby to join and seal said sections together and seal the secondary containment pipes in the sockets, said passages being substantially enclosed and fluid tight when the joint is assembled to minimize leakage of cement.

30. A secondary containment joint as defined in claim 29 wherein said first and second internal sealing passages are joined to form a continuous seal between said pipe sections and around said sockets.

31. A secondary containment joint as defined in claim 30 wherein said means for introducing sealing cement into said first passages comprise injection ports formed in said joint sections and opening into said second passages.

32. A secondary containment joint as defined in claim 29 further including means on said joint sections forming oppositely disposed clamping surfaces on said joint sections on opposite sides of each pair of abutting surfaces.

33. A secondary containment joint as defined in claim 32 further including C-shaped clips straddling said clamping surfaces and engaging said oppositely disposed surfaces.

34. A secondary containment joint as defined in claim 29 wherein said joint sections have laterally projecting external flanges forming said opposed side edges, said flanges having relatively wide abutting surfaces formed with grooves forming said first passages.

35. A secondary containment joint as defined in claim 34 further including clamping means for securing said flanges together for injection and setting of sealing cement.

36. For use in a secondary containment system for a primary pipe system, in combination with secondary containment joints having pipe sockets of generally circular cross-sectional shape, a secondary containment pipe comprising two side-by-side pipe elements fitted together on opposite sides of a central dividing plane and each having:
  an elongated body of generally semi-circular cross-sectional shape with two side edges extending along said plane and abutting against the side edges of the other pipe element,
  latching means including interfitting tongue-and-groove elements along the edges of said pipe elements, sized and shaped for a snap-latching fit for latching said pipe elements together,
  means defining a continuous sealing passage between opposed surfaces of said pipe elements along each pair of abutting edges, and injection port means to receive adhesive sealing cement for filling said sealing passages to seal the interior of the pipe and adhesively secure said pipe elements together.

37. A secondary containment pipe as defined in claim 36 wherein said sealing passages are defined as continuous passages along said latching means, the latter include spaces communicating with said sealing passages to permit said adhesive cement to substantially fill the sealing passages and the spaces in said latching means and to adhesively lock the latching means together and reinforce the sealing of the containment pipe.

38. A secondary containment pipe as defined in claim 37 wherein each of said pipe elements has along one side edge an internal sealing flap joined to the inner surface of the pipe elements along said one side edge and extending across the dividing plane and an edge portion of the other pipe element into abutting engagement with the inner surface of the other pipe element along a line spaced from the edge thereof, said flap being spaced from the inside surfaces of said pipe elements along the abutting edges to define the sealing passage.

39. A secondary containment pipe as defined in claim 38 wherein said flap has a free edge portion abutting against said inner surface along said line, and further including means on the inner surface of said other pipe section for holding said free edge portion against said inner surface.

40. A secondary containment pipe as defined in claim 39 wherein said means for holding said free edge portion is an internal rib defining an internal groove receiving said free edge portion.

41. A secondary containment pipe as defined in claim 39 wherein said free edge portion has a thickened inner edge forming a bead abutting against said inner surface along said line.

42. A secondary containment pipe as defined in claim 37 wherein said latching means have groove elements with restricted entry sides and enlarged inner portions forming said sealing passages and have tongue elements larger than said entry sides and smaller than said enlarged inner portions, and disposed in said passages with an interference fit.

43. A secondary containment pipe as defined in claim 42 further including injection ports extending through said pipe sections from the outer sides thereof into said enlarged inner portions for the injection of the adhesive sealing cement therein.

44. A secondary containment pipe as defined in claim 37 further including an elongated reinforcing strip disposed against the outer sides of the pipe and overlying the abutting edges of the pipe sections, and adhesive cement securing and sealing each strip to both pipe sections on opposite sides of the abutting edges.

45. For use in a secondary containment system for a primary pipe system, in combination with secondary containment joints having pipe sockets of generally circular cross-sectional shape, a secondary containment pipe comprising a plurality of elongated pipe elements adapted to be fitted together around a primary pipe in abutting edge-to-edge relation to enclose the primary pipe in a flange-free sheath, said elements having:
  elongated bodies of part-circular cross-sectional shape with two longitudinal edges, each abutting against the adjacent edge of an adjacent pipe element;
  latching means along said longitudinal edges for latching the abutting edges together;
  means defining continuous internal sealing passages between said longitudinal edges, and including means for introducing adhesive sealing cement into said passages to substantially fill the latter, thereby to join and seal said elements together; each of said elements having, along one of its longitudinal edges, an internal sealing flap extending over the adjacent pipe element and into abutting engagement therewith, and each flap defining an internal sealing passage along the abutting edges.

46. A secondary containment pipe as defined in claim 45 wherein said latching means comprise tongue-and-groove joints along said edges, and said internal sealing passages are within the joints.

47. A secondary containment pipe as defined in claim 46 further including internal detents on said pipe elements for receiving and holding the free edges of said flaps, as part of said latching means.

48. A secondary containment pipe as defined in claim 47 further including tongue-and-groove latching elements along said side edges, with internal spaces communicating with said internal sealing passages to receive cement therefrom.

49. For use in a secondary containment system for a primary pipe system, in combination with secondary containment joints having pipe sockets of generally circular cross-sectional shape, a secondary containment pipe comprising a plurality of elongated pipe elements adapted to be fitted together around a primary pipe in abutting edge-to-edge relation to enclose the primary pipe in a flange-free sheath, said elements having:
  elongated bodies of part-circular cross-sectional shape with two longitudinal edges, each abutting against the adjacent edge of an adjacent pipe element;
  latching means along said longitudinal edges for latching the abutting edges together;
  means defining continuous internal sealing passages between said longitudinal edges, and including injection port means for introducing adhesive sealing cement into said passages to substantially fill the latter, thereby to join and seal said elements together and an elongated external reinforcing strip overlying the abutting edges of said elements on each side and adhesively secured thereto.

50. For use in a secondary containment system for a primary pipe system including a primary pipe joint of selected shape in combination with secondary containment pipes of generally circular cross-sectional shape to be disposed around primary pipes, a secondary containment component comprising a plurality of parts adapted to be fitted together around a component of the primary system to cover the latter and having side edges disposed in abutting edge-to-edge relation;
  means defining substantially enclosed and substantially fluid tight continuous sealing passages along said edges for receiving and holding adhesive sealing cement for securing and sealing said parts together;
  means defining at least one cement injection port communicating with said passages for introducing the cement into the passages to substantially fill the latter and form a continuous fluid-tight seal; and
  means for holding said parts together prior to introduction of the cement and while the cement is setting;
  said passages being substantially enclosed and fluid tight along said edges when the parts are held together, to minimize leakage of adhesive cement during and after injection, but having clearance permitting the escape of air during such injection, to permit the flow of cement along the passages.

51. A secondary containment component as defined in claim 50 wherein said parts are two joint sections of a primary containment joint, defining at least two pipe sockets and being divided along a central parting plane, said joint sections having laterally projecting flanges along the side edges of the joint sections formed with grooved abutting surfaces defining said passages, and also having second passages within said pipe sockets communicating with said passages along said edges to form a continuous passage around the interior of the joint, said pipe sockets being sized to receive pipes with a snug fit to complete the substantial sealing of the passages for injection of cement.

52. A secondary containment component as defined in claim 51 wherein said parts are transparent to permit visual observation of colored cement flowing in said passage, thereby to insure complete sealing.

53. A secondary containment component as defined in claim 52 wherein said latching elements are interfitting tongue-and-groove elements, and said passages are formed as a part of the groove element and are substantially closed by the tongue elements when the parts are together.

54. A secondary containment component as defined in claim 52 wherein said parts are two elongated pipe elements of a secondary containment pipe, having interfitting latching elements along longitudinal side edges of the elements, said passages being defined within said latching elements to secure and seal the elements together, and wherein said latching elements include an internal flap along one longitudinal side edge of each pipe element, extending over the adjacent pipe element and into internal abutting engagement therewith, each flap defining an internal sealing passage between the elements.

55. A secondary containment pipe joint section for use with a similar section to form a pipe joint, comprising:
 at least two half sockets of semi-circular cross-sectional shape having flat sides lying along a common plane including the axes of said half sockets, the half sockets being joined together by a joint body having edges lying along said common plane;
 said joint section having relatively wide side edges facing toward said plane and extending between adjacent sides of said half sockets, each of said side edges having surfaces lying along said plane for abutting engagement with opposed surfaces on a similar section, and means defining a shallow first groove extending along the edge from an end at one of the half sockets to an opposite end at the adjacent half socket;
 means defining a shallow second groove in each half socket extending across the half socket from one side edge to the other, and opening at each end into one of said first grooves;
 and injection means along said grooves for receiving fluid adhesive sealing cement therein when two joint sections are disposed in abutting side-by-side relation with pipes in the pipe sockets formed by pairs of half sockets.

56. A pipe joint section as defined in claim 55 having laterally projecting flanges along the sides of said pipe joint section, with one side of each flange lying along said plane and carrying said surfaces and said first grooves.

57. A pipe joint section as defined in claim 56 wherein said pipe joint section has three half sockets, two lying on a common axis and a third disposed at a right angle, one of said flanges extending in a substantially straight line between corresponding sides of the half sockets on a common axis, and two additional flanges extending through right angles between the other sides of said two half sockets and the third.

58. A pipe joint section as defined in claim 56 wherein said pipe joint has two half sockets lying on axes at ninety degrees to each other, one of said flanges being arcuately curved and the other extending through a right angle.

59. The method of forming a secondary containment system around a primary pipe system having a primary pipe joint joining two or more primary pipes, comprising:
 providing a longitudinally divided secondary containment joint comprising a plurality of joint sections adapted to be fitted together in edge-to-edge relation around the primary joint, and having at least two pipe sockets for receiving secondary containment pipes, and forming first grooves between the abutting edges of said joint sections to define first internal sealing passages, and forming second grooves extending around the sockets to define second internal sealing passages around the ends of secondary containment pipes in the sockets;
 providing secondary containment pipes for fitting around the primary pipes and fitting closely in the sockets;
 positioning the joint sections around the primary pipe joint and the secondary containment pipes around the primary pipes, and clamping the joint sections together;
 injecting adhesive sealing cement in fluid form into the first and second internal sealing passages to substantially fill the latter and form adhesive seals between the abutting edges and around each pipe socket;
 and maintaining the clamping of the joint sections at least until the cement has set.

60. The method defined in claim 59 wherein the steps of forming said first and second sealing passages includes forming those passages to communicate with each other and provide a continuous sealing passage extending completely around and sealing the interior of the joint, and the injecting step is performed to inject the adhesive sealing cement into both the first and second passages at substantially the same time.

61. The method defined in claim 59 wherein the step of providing secondary containment pipes includes the provision of longitudinally divided pipes each constituting a plurality of pipe elements adapted to be fitted together in edge-to-edge relation around a primary pipe, and having coupling means along the abutting edges of the pipe elements for latching the pipe elements mechanically together, and means along the abutting edges defining third internal sealing passages between the pipe elements; and including the further steps of:
 latching the pipe elements together around the primary pipes with said coupling means; and
 injecting adhesive sealing cement in fluid form into said third internal sealing passages to substantially fill the latter and form adhesive seals between the pipe elements.

62. The method defined in claim 61 wherein said coupling means are formed with clearance spaces therein communicating with said third passages, and the last-mentioned injecting step includes injection of adhesive sealing cement into the clearance spaces and around the coupling means to secure the pipe elements together.

63. The method of forming a secondary containment system around a primary pipe system having primary pipe components joined by primary joint components, comprising:

providing longitudinally divided secondary pipe and pipe joint components larger than the primary components and having the same general shape, to overlie and ensheath the primary components when the secondary components are disposed in edge-to-edge abutting relation, including pipe sockets in the pipe joint components;

providing continuous sealing passages along the abutting edges and around the pipe sockets of the secondary components for receiving adhesive sealing cement;

assembling the secondary components around the primary components with the secondary pipe components received in the secondary pipe joint components, and securing the secondary components together in a temporary fashion;

substantially filling the continuous sealing passages with adhesive sealing cement to form continuous seals and secure the components together;

and holding the secondary components together at least until the cement has set.

64. The method of forming a secondary containment system around a primary pipe system having primary pipe components joined by primary joint components, comprising:

providing longitudinally divided secondary joint components larger than the primary joint components to be fitted together in edge-to-edge abutting relation around the primary joint components, and including pipe sockets;

providing continuous sealing passages along the abutting edges and around the pipe sockets for receiving adhesive sealing cement;

providing secondary containment pipe components for fitting around the primary pipe components and fitting closely in the pipe sockets;

assembling the secondary components around the primary components with the secondary pipe components received in the secondary pipe joint components, and securing the secondary components together in a temporary fashion;

substantially filling the continuous sealing passages with adhesive sealing cement to form continuous seals and secure the components together;

and holding the secondary components together at least until the cement has set.

65. The method defined in claim 64 in which the joint components are provided in transparent material and the cement is provided in a contrasting color, and including the further step of visually observing the flow of cement in said passages.

66. The method defined in claim 65 in which said pipe components also are provided as longitudinally divided transparent components, and with additional continuous sealing passages provided along abutting edges thereof, and including the further steps of substantially filling the additional sealing passages with adhesive sealing cement of contrasting color, and visually observing the flow of cement along the additional passages.

* * * * *